US012625889B2

(12) United States Patent
Xu et al.

(10) Patent No.: US 12,625,889 B2
(45) Date of Patent: May 12, 2026

(54) AI USER INTENT FOR ACTIONS ON A USER DEVICE

(71) Applicant: Gen Digital Inc., Tempe, AZ (US)

(72) Inventors: Howie Xu, Palo Alto, CA (US); Omer Shilo, Memmingen (DE); Evgeny Sidorenko, Tettnang (DE); Gal David Shilo, Horgenzell (DE); Christopher Joseph O'Connell, Tucson, AZ (US); Danni Chen, Pleasanton, CA (US); Alejandro Romero, South San Francisco, CA (US); Pawel Stanek, Wroclaw (PL)

(73) Assignee: Gen Digital Inc., Tempe, AZ (US)

( * ) Notice: Subject to any disclaimer, the term of this patent is extended or adjusted under 35 U.S.C. 154(b) by 0 days.

(21) Appl. No.: 18/916,080

(22) Filed: Oct. 15, 2024

(65) Prior Publication Data

US 2026/0105071 A1 Apr. 16, 2026

(51) Int. Cl.
*G06F 16/00* (2019.01)
*G06F 16/28* (2019.01)

(52) U.S. Cl.
CPC ................................. *G06F 16/285* (2019.01)

(58) Field of Classification Search
CPC .......... G06F 40/30; G06F 3/013; G06F 3/017; G06F 3/167; G06F 40/205; G06F 3/011; G06F 9/453; G06F 40/295; G06F 16/243; G06F 16/248; G06F 16/951; G06F 16/338; G06F 16/24578; G06F 16/2455; G06F 16/24575; G06F 16/285; G06N 20/00; G06N 3/08; G06N 3/045; G06N 3/006; G06N 5/04; H04L 67/02
See application file for complete search history.

(56) References Cited

U.S. PATENT DOCUMENTS

| | | | |
|---|---|---|---|
| 9,110,728 B2 | 8/2015 | He et al. | |
| 11,669,779 B2 | 6/2023 | Shang et al. | |
| 11,822,657 B2 | 11/2023 | Tseng et al. | |
| 11,861,472 B2 | 1/2024 | Shang et al. | |
| 2019/0327330 A1* | 10/2019 | Natarajan | G06F 16/2365 |
| 2021/0049413 A1 | 2/2021 | Ma et al. | |
| 2021/0209388 A1* | 7/2021 | Ciftci | G06N 3/045 |
| 2021/0256420 A1* | 8/2021 | Elisha | G06N 20/00 |
| 2021/0377303 A1 | 12/2021 | Bui et al. | |
| 2021/0377304 A1 | 12/2021 | Ma et al. | |
| 2021/0392146 A1 | 12/2021 | Lin et al. | |
| 2021/0392147 A1 | 12/2021 | Ma et al. | |
| 2022/0067581 A1 | 3/2022 | Kumar et al. | |
| 2022/0083661 A1 | 3/2022 | Ma et al. | |
| 2022/0308895 A1* | 9/2022 | Ben-Elazar | G06N 3/045 |
| 2023/0115982 A1 | 4/2023 | Lin et al. | |

(Continued)

*Primary Examiner* — Shyue Jiunn Hwa
(74) *Attorney, Agent, or Firm* — Baratta Law PLLC; Lawrence A. Baratta, Jr.

(57) ABSTRACT

Systems and methods for classifying user intent based on the user interaction with an entry bar on a user device include receiving an input from a user in an entry box; classifying the input into a category of a plurality of categories including a category for an Artificial Intelligence (AI) session for an AI agent; and performing an action responsive to the classified category, including utilizing the AI agent for the AI session when the category is the category for the AI session and bypassing the AI agent for other categories of the plurality of categories.

20 Claims, 8 Drawing Sheets

(56)    References Cited

U.S. PATENT DOCUMENTS

| | | |
|---|---|---|
| 2023/0247010 A1 | 8/2023 | O'Connell et al. |
| 2023/0254318 A1 | 8/2023 | Hu et al. |
| 2023/0353587 A1 | 11/2023 | Bui et al. |
| 2023/0376592 A1 | 11/2023 | Ma et al. |
| 2024/0028721 A1 | 1/2024 | Ma et al. |
| 2024/0119120 A1 | 4/2024 | Zhang et al. |

* cited by examiner

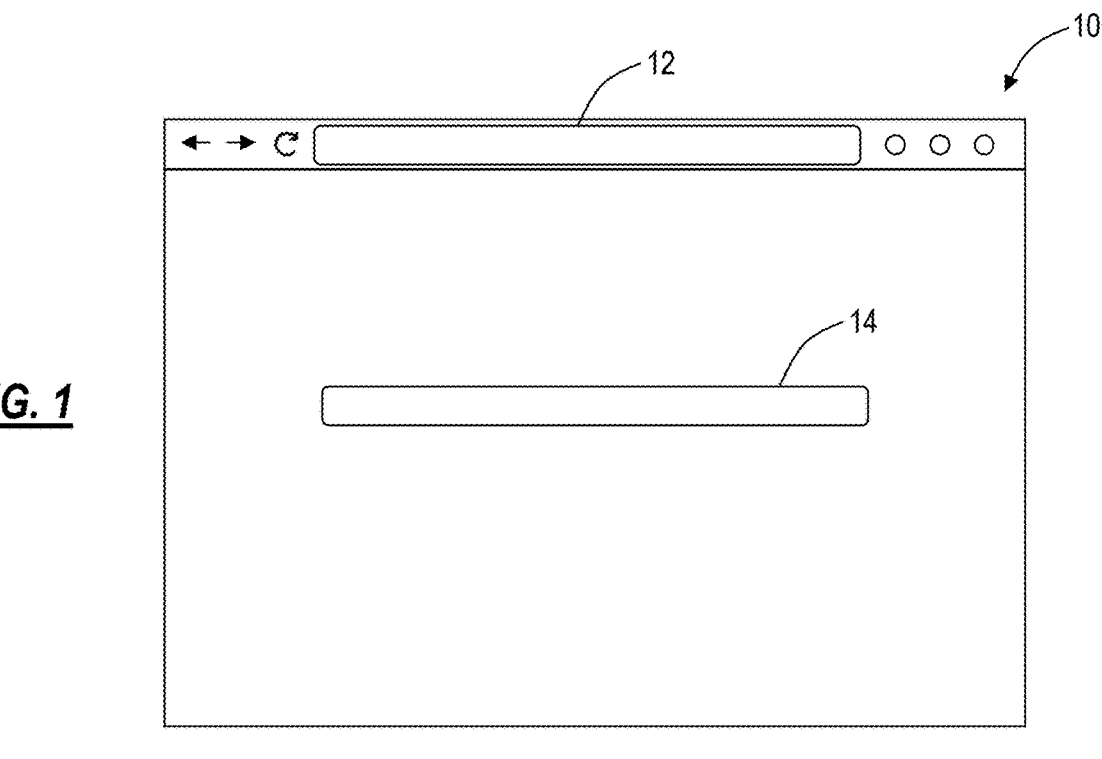

_FIG. 1_

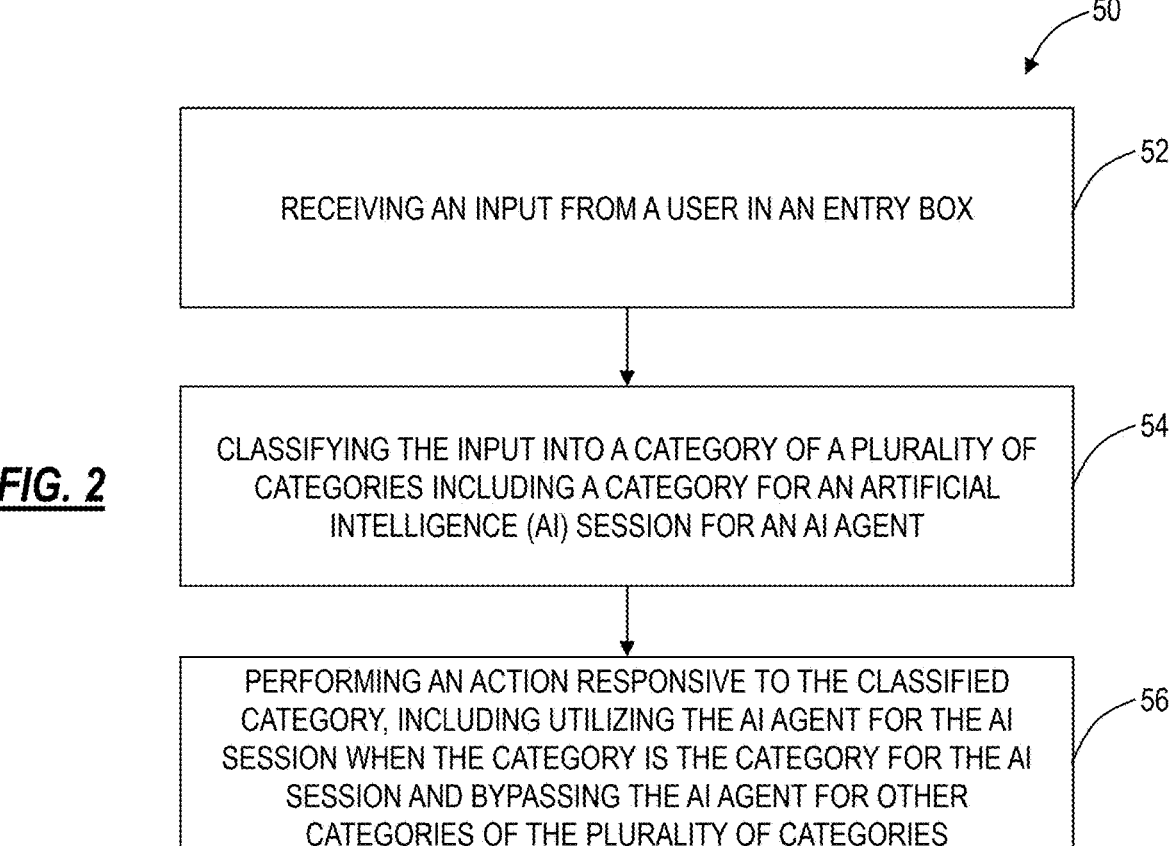

_FIG. 2_

RECEIVING AN INPUT FROM A USER IN AN ENTRY BOX

CLASSIFYING THE INPUT INTO A CATEGORY OF A PLURALITY OF CATEGORIES INCLUDING A CATEGORY FOR AN ARTIFICIAL INTELLIGENCE (AI) SESSION FOR AN AI AGENT

PERFORMING AN ACTION RESPONSIVE TO THE CLASSIFIED CATEGORY, INCLUDING UTILIZING THE AI AGENT FOR THE AI SESSION WHEN THE CATEGORY IS THE CATEGORY FOR THE AI SESSION AND BYPASSING THE AI AGENT FOR OTHER CATEGORIES OF THE PLURALITY OF CATEGORIES

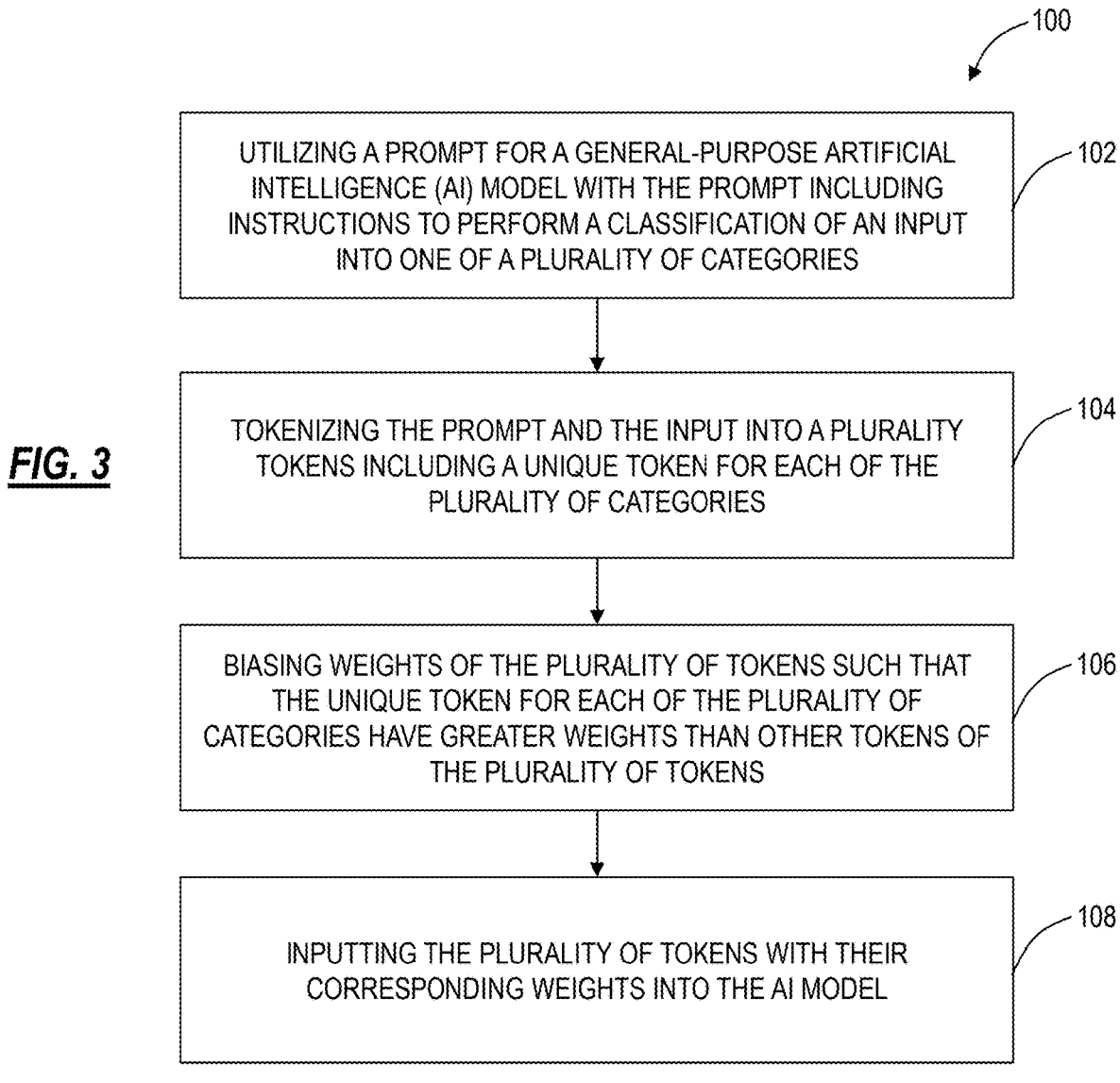

_FIG. 3_

100

UTILIZING A PROMPT FOR A GENERAL-PURPOSE ARTIFICIAL INTELLIGENCE (AI) MODEL WITH THE PROMPT INCLUDING INSTRUCTIONS TO PERFORM A CLASSIFICATION OF AN INPUT INTO ONE OF A PLURALITY OF CATEGORIES — 102

TOKENIZING THE PROMPT AND THE INPUT INTO A PLURALITY TOKENS INCLUDING A UNIQUE TOKEN FOR EACH OF THE PLURALITY OF CATEGORIES — 104

BIASING WEIGHTS OF THE PLURALITY OF TOKENS SUCH THAT THE UNIQUE TOKEN FOR EACH OF THE PLURALITY OF CATEGORIES HAVE GREATER WEIGHTS THAN OTHER TOKENS OF THE PLURALITY OF TOKENS — 106

INPUTTING THE PLURALITY OF TOKENS WITH THEIR CORRESPONDING WEIGHTS INTO THE AI MODEL — 108

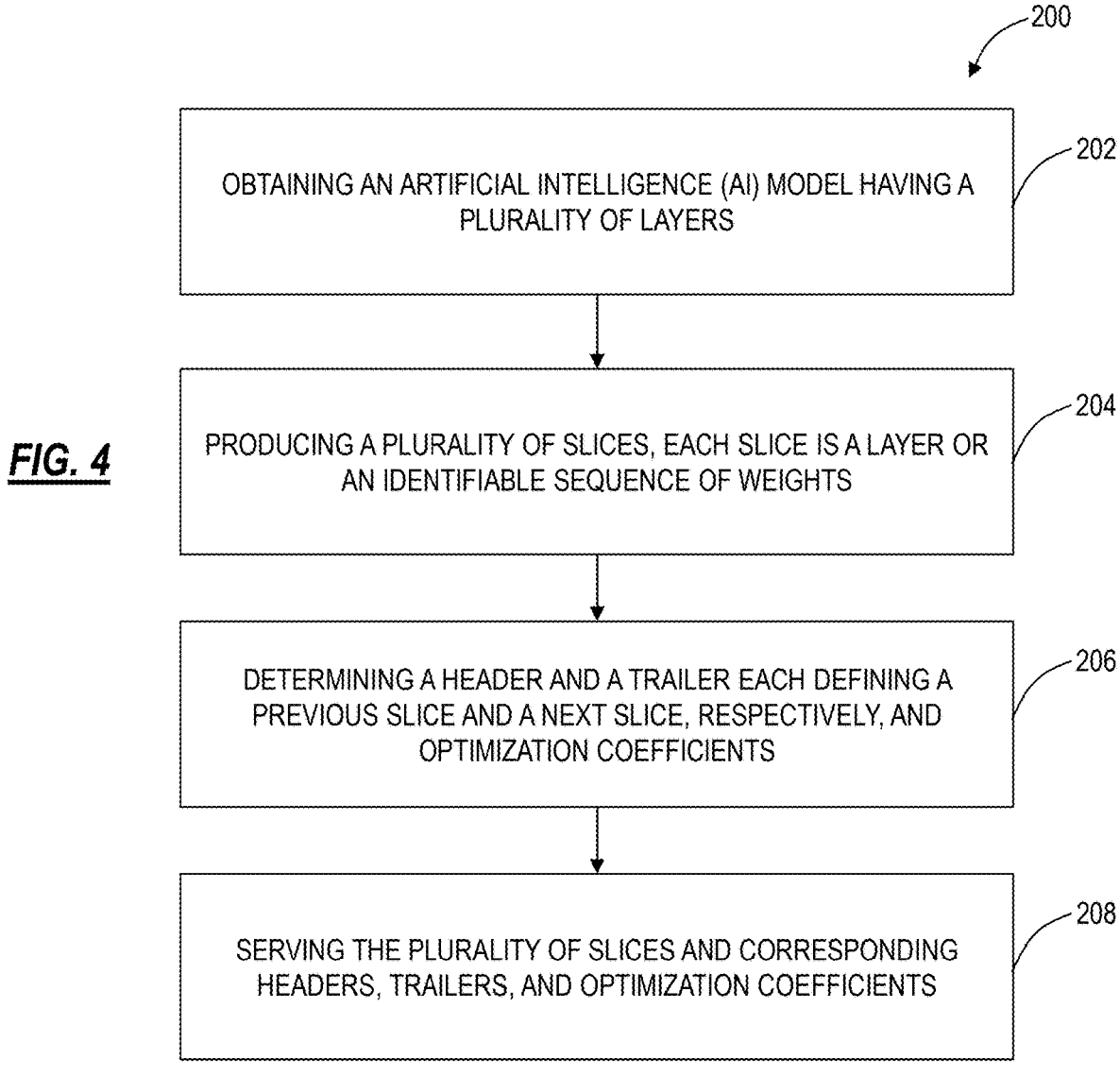

202
OBTAINING AN ARTIFICIAL INTELLIGENCE (AI) MODEL HAVING A PLURALITY OF LAYERS

204
PRODUCING A PLURALITY OF SLICES, EACH SLICE IS A LAYER OR AN IDENTIFIABLE SEQUENCE OF WEIGHTS

206
DETERMINING A HEADER AND A TRAILER EACH DEFINING A PREVIOUS SLICE AND A NEXT SLICE, RESPECTIVELY, AND OPTIMIZATION COEFFICIENTS

208
SERVING THE PLURALITY OF SLICES AND CORRESPONDING HEADERS, TRAILERS, AND OPTIMIZATION COEFFICIENTS

Good Afternoon
How can I help you? — 14

Tell me a joke|

Tell me a joke
Tell me a joke google — 420
Tell me a joke for kids
Tell me a joke interview question
Tell me a joke funny man
Tell me a joke in English
Tell me a joke reddit

— 450

Joke Request ☒

Tell me a joke

Why don't scientists trust atoms?

Because they make up everything!

— 14

Ask me anything or type a URL

_460_
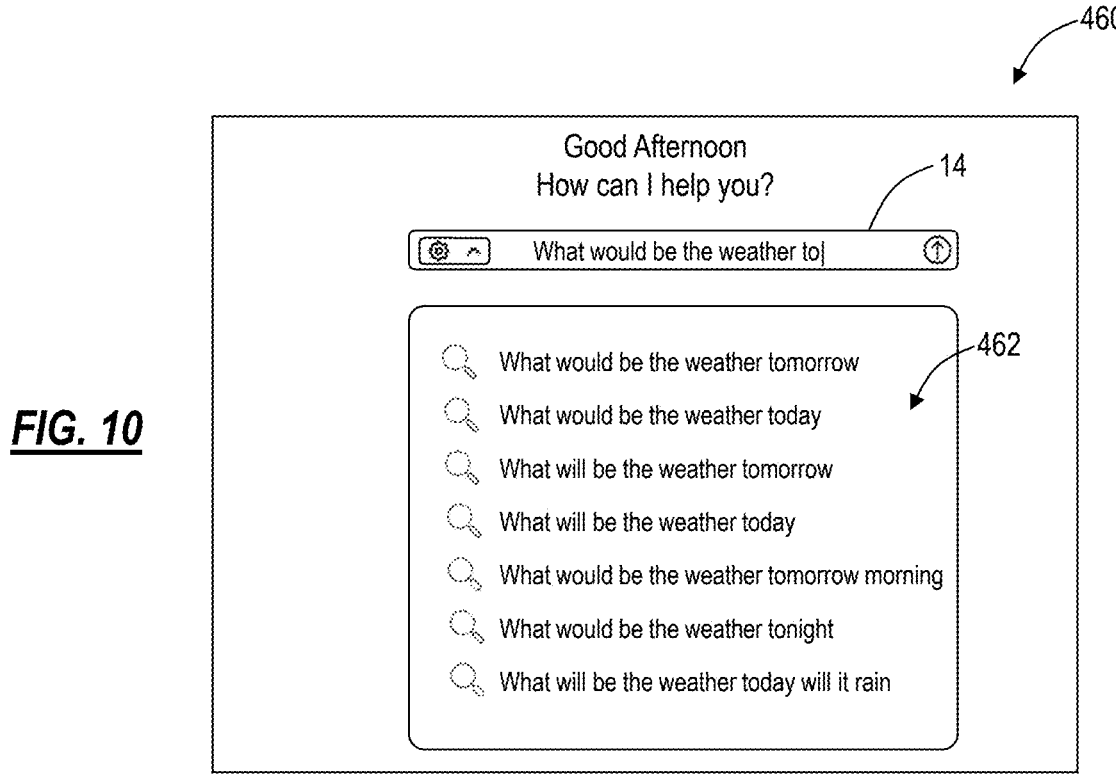
_FIG. 10_
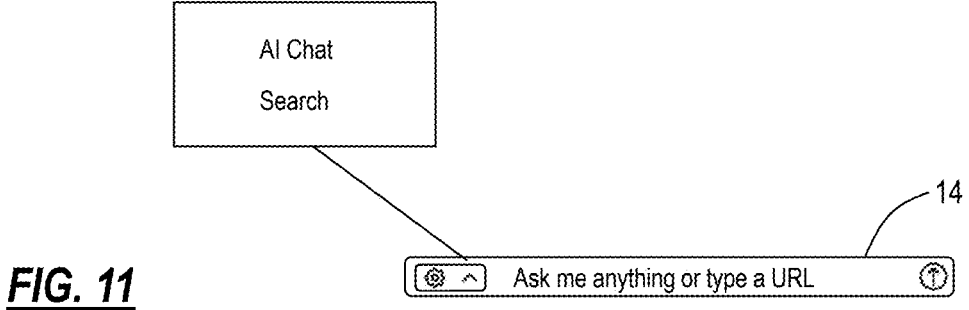
_FIG. 11_

AI USER INTENT FOR ACTIONS ON A USER DEVICE

FIELD OF THE DISCLOSURE

The present disclosure relates generally to computing and Artificial Intelligence (AI). More particularly, the present disclosure relates to systems and methods for AI user intent for actions being performed on a user device such as through a browser, browser extension, plugin, etc., using general-purpose AI models as special purpose classifiers, and AI model bundling and splitting for widescale distribution.

BACKGROUND OF THE DISCLOSURE

User devices, such as smartphones, tablets, laptops, and desktop computers, serve as the physical platforms that run web browsers, which are the primary tools for accessing and interacting with the Internet. Web browsers include an entry box which is also referred to as the address bar, Uniform Resource Locator (URL) bar, search bar, location bar, omnibox, or navigation bar, depending on the browser or context. Users interact with the entry box to enter a URL, a search query, or a specific command or question. For example, typing www.acme.com would invoke a URL, typing a specific command like setup may bring up the browser's configuration, and all other entries may be treated as a search query or question. Further, the browser may utilize history and autocomplete to assist with the user's intent. Conversely, AI tool usage is proliferating and today focuses on external AI tools specifically invoked by a user. The conventional approach requires manual user interaction and selection of the AI tools. It would be advantageous to integrate AI agents directly into the browser environment, via the entry box, locally on the user device.

BRIEF SUMMARY OF THE DISCLOSURE

The present disclosure relates to systems and methods for AI user intent for actions being performed on a user device such as through a browser, browser extension, plugin, etc. Many products (e.g., software tools such as browsers) are now integrating AI agents into their workflows, typically in one of two ways. The most common approach requires users to manually select when they want to use an AI agent, leading to additional user interface interactions and the need to educate users about the AI option. This also introduces the downsides of having separate modes in the interface (e.g., AI mode vs. non-AI mode). Alternatively, some products pass all user inputs to the AI, which may rely on other systems for support, integrating those outputs into its response (sometimes called a Retrieval Augmented Generation architecture). While this approach eliminates the need for mode selection, it introduces significant latency and costs due to the AI processing time. Moreover, incorporating additional resources into the AI's reasoning chain creates integration challenges and increases the risk of AI "hallucinations," which can lead to inaccurate responses. This issue is particularly challenging for browsers, where it is crucial to determine whether the user intends to visit a URL, open a resource, access ephemeral information, engage with an AI assistant, or perform other actions. To that end, the present disclosure includes various approaches to detect user intent via AI for various actions.

In an embodiment, the present disclosure includes quickly and precisely classifying user interaction automatically as the user types in the entry box (or alternatively, immediately upon hitting the "return" key, or action button.) This classification is performed locally on the user device and the present disclosure also includes various techniques for supporting an AI model locally on the user device. In another embodiment, the present disclosure includes the use of a general-purpose AI model on the user device as a special purpose classifier for the classifying user interaction, thereby removing the need to have separate AI models on the user device. In another embodiment, the present disclosure includes approaches to bundling and splitting AI models for widespread distribution to different types of user devices (in terms of hardware, memory, processing capability, etc.).

The present disclosure makes a browser or the like into a "co-browser," following a user every step of the way, giving shortcuts and streamlining interactions. This can save time initiating AI sessions instead of providing search queries. The present disclosure includes such approach with various embodiments for including classifying intent and getting the shortcut. It is based on both AI model (local or remote) and information about you (history, profile, etc.). The functionality of the entry box is more powerful than existing boxes which toggle between search and URL.

The objective of these various techniques is to improve user experience by accurately and quickly inferring intent, eliminating requirements for the user to actively select different functions (e.g., search, AI, URL, or other actions) while improving latency. With the techniques descried herein, the intent can be quickly determined, with slow, expensive and non-deterministic techniques entirely omitted in cases where it is not necessary, saving costs (processing power, battery, etc.), but also significantly improving response speed and continuing to provide a partially available system in the case where the AI agent is unavailable (either due to a lack of connection to a hosted model or a lack of local hardware to execute the more advanced task on a local model). The combination of these features in a browser provides a uniquely fast and effective user experience.

In various embodiments, the present disclosure contemplates implementation as a method having steps, via an apparatus such as a user device configured to implement the steps, and as a non-transitory computer-readable medium storing instructions that, when executed, cause one or more processors to execute the steps. In an embodiment, the steps include receiving an input from a user in an entry box; classifying the input into a category of a plurality of categories including a category for an Artificial Intelligence (AI) session for an AI agent; and performing an action responsive to the classified category, including utilizing the AI agent for the AI session when the category is the category for the AI session and bypassing the AI agent for other categories of the plurality of categories. The classifying can be performed by an AI model associated with the AI agent, the AI model being a general-purpose AI model configured to perform the AI session as well as to provide the classifying. The classifying can be performed using matching via regular expressions. The classifying can be performed first using matching via regular expressions as the input is being received until a confidence level is reached, and second via an AI model associated with the AI agent where the confidence level is not reached.

The plurality of categories can also include a category for a Uniform Resource Locator (URL) for loading an associated address and a category for data for obtaining a resource from an external system. The classifying can be performed as the input is being received until a confidence level is reached, without having a full input from the user. The classifying can include, for each character of the input during the receiving, attempting to determine the category; determining a confidence score for each of the attempting; and determining the classified category based on a level of the confidence score. The performing the action can include pre-loading a webpage if the category is a Uniform Resource Locator (URL). The performing the action can include, if the category is the AI session, performing a connection to the AI agent; and loading base prompts and some parts of a query to the AI agent.

In another embodiment, the steps include utilizing a prompt for a general-purpose Artificial Intelligence (AI) model with the prompt including instructions to perform a classification of an input into one of a plurality of categories; tokenizing the prompt and the input into a plurality tokens including a unique token for each of the plurality of categories; biasing weights of the plurality of tokens such that the unique token for each of the plurality of categories have greater weights than other tokens of the plurality of tokens; and inputting the plurality of tokens with their corresponding weights into the AI model. The steps can further include receiving an output from the AI model with the output being a category of the plurality of categories corresponding to the input. The steps can further include performing an action which is based on the category. The steps can further include utilizing the AI model for an AI session based on the category determining the input is requesting the AI session. The steps can further include feeding the plurality of token with their corresponding weights for the prompt to the AI model prior to receiving the input. The steps can further include receiving the input from a user and continually feeding tokens for a partial version of the input to the AI model with the plurality of token with their corresponding weights for the prompt already fed into the AI model. The general-purpose AI model can be executed on a user device for both the classification and for AI sessions.

In a further embodiment, the steps include obtaining an Artificial Intelligence (AI) model having a plurality of layers; producing a plurality of slices, each slice is a layer or an identifiable sequence of weights; determining a header and a trailer each defining a previous slice and a next slice, respectively, and optimization coefficients; and serving the plurality of slices and corresponding headers, trailers, and optimization coefficients. The steps can further include, for a given processing device having a set of hardware, performing the serving to provide a set of slices of the plurality of slices to construct a version of the AI model for the given processing device. The producing a slice of the plurality of slices can include quantizing an individual layer of the plurality of layers or the identifiable sequence of weights for given hardware. The producing a slice of the plurality of slices can include quantizing a plurality of parameters associated with an individual layer of the plurality of layers or the identifiable sequence of weights for given hardware. The given hardware can be a type of processor and an amount of memory. The type of processor can be one of a Central Processing Unit (CPU), a Tensor Processing Unit (TPU), a Neural Processing Unit (NPU), and a Graphics Processing Unit (GPU), and wherein the memory is one of Random Access Memory (RAM) and Video RAM (VRAM).

BRIEF DESCRIPTION OF THE DRAWINGS

The present disclosure is detailed through various drawings, where like components or steps are indicated by identical reference numbers for clarity and consistency.

FIG. 1 illustrates a screenshot of a browser window associated with a web browser operating on a user device.

FIG. 2 illustrates a flowchart of a process for classifying user intent based on user interaction with the entry box.

FIG. 3 illustrates a flowchart of a process for using general-purpose AI models as special purpose classifiers.

FIG. 4 illustrates a flowchart of a process for AI model bundling and splitting for widescale distribution

FIGS. 6 to 13 are screenshots illustrating example operations of the browser window and the various techniques described herein.

DETAILED DESCRIPTION OF THE DISCLOSURE

Figure 5:
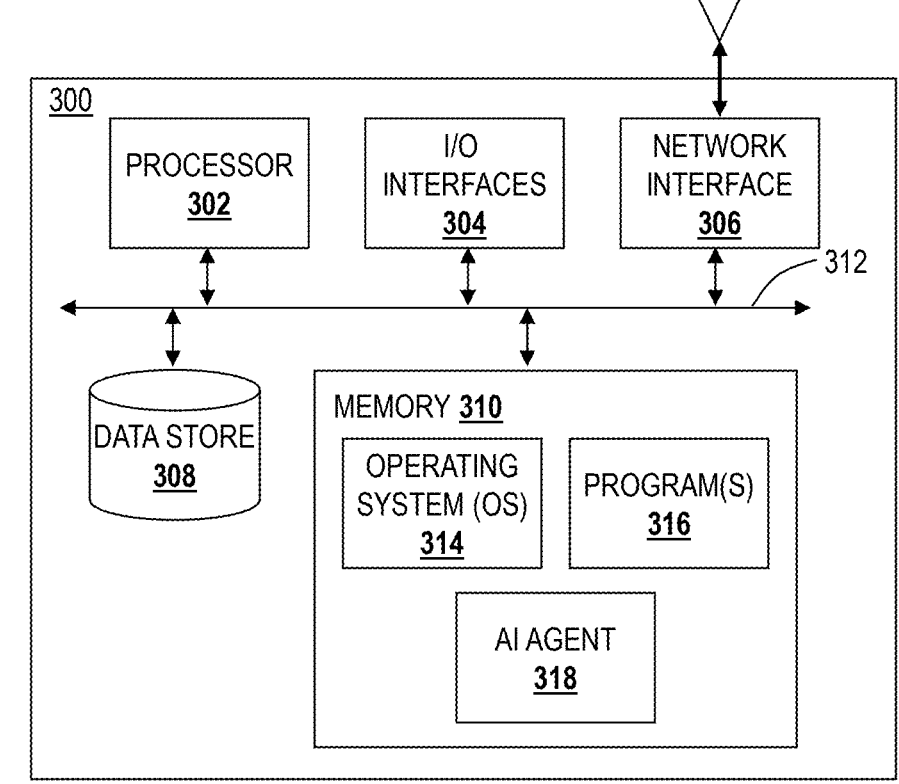
FIG. 5 illustrates a block diagram of a processing device.

Again, the present disclosure relates to systems and methods for AI user intent for actions being performed on a user device such as through a browser, browser extension, plugin, etc. FIG. 1 illustrates a screenshot of a browser window 10 associated with a web browser operating on a user device. Again, web browsers are the primary tools for accessing and interacting with the Internet. A web browser allows a user to view, navigate, and engage with web pages, multimedia, and web applications by rendering code like Hypertext Markup Language (HTML), Cascading Style Sheets (CSS), and JavaScript into readable and interactive content. It also provides essential features such as tabs, bookmarks, and security protocols to ensure safe browsing. The browser window 10 illustrates an example of a Graphical User Interface (GUI) of a browser on a user device. A browser window or tab can be referred to by various names depending on the context. Common alternatives for a browser window include terms like web window, browser instance, viewing window, or browser viewport. Similarly, a browser tab may also be called a tab page, tabbed window, document tab, or page tab. These terms emphasize different aspects of the browser's interface, such as how content is displayed, managed, or navigated within a session. The present disclosure uses the term browser window 10 and those skilled in the art will appreciate this term is meant to encompass any of the previous terms.

The browser window 10 includes an entry box 12, typically located on or near the top of the browser window 10. The entry box 12 is also referred to as the address bar, URL bar, search bar, location bar, omnibox, or navigation bar, depending on the browser or context. Those skilled in the art will appreciate the entry box 12 is meant to cover all of these different terms, and various methods of entry, such as keyboards, on-screen keyboards, text-to-speech and other mechanisms by which the user may enter information. The entry box 12 is central to web navigation, allowing users to enter URLs to visit specific websites or type search queries that are processed by the browser's integrated search engine. Additional features, like autocomplete, browsing history, and security indicators (e.g., Hypertext Transfer Protocol Secure (HTTPS) padlocks), improve ease of use and safety when navigating the web. The entry box 12 is the versatile input field in modern web browsers that combines the functions of an address bar and a search bar. It allows users to enter URLs to navigate directly to websites or input search queries that are processed by the browser's default search engine. As is described herein, the present disclosure further enhances the functionality of the entry box 12 using AI on the user device.

The browser window 10 can also include a search box 14 typically located with the browser window 10. The search box 14 is a user-friendly tool designed to help visitors quickly find specific content within a website. Both the entry box 12 and the search box include a text input field where users can type keywords or phrases related to their intent. Once a query is entered, the search box 14 can send the input to the website's search engine, which processes the request and returns relevant results, such as pages, articles, or products that match the search terms. This feature enhances navigation, saves time, and improves the overall user experience by making it easier to locate specific information without manually browsing through the site's content.

The input to the search box 14 is processed off the user device by the website's internal search engine or database, which retrieves and displays content relevant to the query from within that specific site. In contrast, input to the entry box 12 is processed locally by the user device. Also, while the present disclosure is illustrated with reference to the browser window 10, those skilled in the art will recognize this could also be an operating system desktop, where the entry box 12 or the search box 14 is included therein, a widget or equivalent on a mobile device screen, and the like.

The present disclosure will use the term entry box 12 to refer to any input field, receiving text, audio, gestures, etc., i.e., any mode of input, from a user. Specifically, the present disclosure provides techniques for inferring user intent in the entry box 12 locally on the user device. The objective is to quickly and precisely classify the user interaction automatically as the user types or enters in the entry box 12 (or alternatively, immediately upon hitting the "return" key, or action button, or upon completion of a timeout or other detection of completed entry). This is to determine whether the user wants to visit a URL, open a resource, access ephemeral information, engage with an AI assistant, look through history, or other various classes of action.

Note, the conventional entry box 12 supports URL inputs and search queries. Here, the entry box 12 assumes it is a URL based on the standard structured format of URLs, e.g., the HTTP, the www., etc., and assumes everything else is a search query. One approach could be to process the user interaction with an AI agent all the time, but this adds significant additional latency and cost waiting for the AI to respond, as well as the possibility of hallucinations. To that end, the present disclosure includes:

(1) An approach to classify user intent based on the user interaction with the entry box 12 into one of a plurality of categories. The categories can include URL, i.e., load a webpage, CHAT, i.e., invoke an AI session, DATA, i.e., load a resource from an external system, etc. Key to this is an approach where there are a finite number of categories and a catch-all, such as the DATA where any unknown intent is fed to a search engine. The objective here is to improve user experience, remove manual inputs, speed up AI sessions, optimize costs in terms of power and compute resources, and the like. In particular, with AI sessions, the ability to detect intent allows preprocessing to improve the latency of any responses from an AI agent.

(2) An approach to use a general-purpose AI model as a special purpose classifier. The general-purpose AI model acts as a classifier through a combination of prompting tricks and modification of the token probabilities inside the model. In addition, pre-prompting or a Low-Rank Adaptation (LoRA) can further speed up this process. By carefully manipulating both the input and output token stream, the model can be guaranteed or virtually guaranteed to return one of a set of desired classes. Advantageously, this removes the need for a second AI model on the user device for classification, i.e., the same AI model can be used for classification as well as for the AI sessions.

(3) An approach for AI model bundling and splitting for widescale distribution to user devices. Of note, there are a wide range of user devices in terms of hardware (Central Processing Units (CPIs), Graphics Processing Units (GPUs), etc.), memory, processing power, etc. One approach is to ship an AI model for particular user devices. This approach is sub-optimal and difficult to manage. The AI model bundling and splitting provides various techniques for creating an appropriate AI model for use in a diverse range of hardware.

These three approaches contemplate implementation together in combination as well as separately. Specifically, the approach to classify user intent can be used stand alone as well as with one or both of the approach to use a general-purpose AI model as a special purpose classifier or the approach for AI model bundling and splitting. As well, the approach to use a general-purpose AI model and the approach for AI model bundling and splitting can be used stand alone as well as with one another, and the approach for AI model bundling is useful for a variety of additional applications which require the distribution of AI models to user devices, such as cybersecurity, content (image, audio video) generation and recognition, distributed agents, etc.

AI Model, Agent, and Session

The present disclosure utilizes the terms AI model, AI agent, and AI session. An AI model refers to the underlying algorithm or mathematical structure trained to perform specific tasks, such as language understanding, image recognition, or decision-making, including variously the model weights and associated code to perform computations using those weights. This model is typically pre-trained on vast amounts of data and can generate outputs or predictions based on new inputs. An AI agent, on the other hand, is an autonomous system that uses one or more AI models to interact with its environment or users, performing tasks, making decisions, or solving problems on behalf of the user. It acts based on inputs it receives, leveraging the AI model for processing and response generation. An AI session refers to a specific interaction or instance of use between a user and the AI agent, where the agent processes the user's inputs and provides outputs within a continuous, often time-bound, context. During a session, the AI agent might draw on its model to maintain context or follow a particular task until completion. Also, the terms AI model and simply "model" are equivalent herein as well as the terms AI agent and simply "agent."

In the context of local software on a user device, the AI model is the core computational engine, including the pre-trained algorithms and data structures that perform specific tasks, such as recognizing speech, understanding text, or analyzing images. It is essentially the "brains" behind the operation, responsible for processing input and producing intelligent outputs based on its training. The model, however, is passive and only operates when called upon. The AI agent, on the other hand, is an active system or application that runs on the user's device, utilizing the AI model to interact with the user or other software. The AI agent acts as a mediator between the model and the user, handling tasks such as receiving user inputs, managing context, and invoking the model when necessary to deliver meaningful results. In this way, the agent provides the intelligence in a usable form, managing the user's requests and dynamically applying the model's capabilities to complete tasks, provide recommendations, or assist with software operations. In summary, the AI model does the "thinking," while the AI agent handles the "doing" by interacting with the user and leveraging the model's intelligence to solve problems or perform tasks on the local device.

Various embodiments described herein focus on an AI model and AI agent located on the user device for quickly, efficiently, and accurately classifying the user's intent with the entry box 12.

Classify User Intent Based on the User Interaction with the Entry Box

Again, the products are integrating various AI agents into their workflows. Unfortunately, this takes one of two forms where the user has to manually select the AI agent or all interactions are passed through the AI agent. In the first case, there are additional user interface interactions, along with the need to teach users about the AI option as well as the many downsides of having modes in the interface (AI mode vs non-AI being the basic version of this). Disadvantageously, this places responsibility on the user where the user may not know exactly what they want, as well as additional steps. The other case passes all user inputs to the AI agent, with the AI agent falling back to calling other systems and integrating such outputs into its response. While such systems remove the need for the user to select a mode, they also introduce significant additional latency and cost waiting for the AI agent to respond. In addition, adding additional resources into the AI agent reasoning chain brings with it a wealth of additional integration challenges, and adds the possibility of AI "hallucinations" into what should otherwise be very precise answers.

The present disclosure focuses on an AI agent operating locally on a user device and this brings a set of challenges different from having back-end systems, such as with the search box 14 and cloud resources handling the queries. The user device does not have the same level of compute power, hardware, memory, battery, etc. In particular, this problem very highly affects browsers where it is necessary to determine whether the wants to visit a URL, open a resource, access ephemeral information, engage with an AI assistant, look through history or other various classes of action. Passing all queries through the AI agent locally is not feasible as it consumes resources and adds latency, and requiring the user to manually select adds extra steps leading to sub-optimal user experience.

FIG. 2 illustrates a flowchart of a process 50 for classifying user intent based on user interaction with the entry box. The process 50 contemplates implementation as a method having steps, via a user device with one or more processors configured to implement the steps, and as a non-transitory computer-readable medium storing instructions that, when executed, case one or more processors to execute the steps. The steps include receiving an input from a user in an entry box (step 52); classifying the input into a category of a plurality of categories including a category for an Artificial Intelligence (AI) session for an AI agent (step 54); and performing an action responsive to the classified category, including utilizing the AI agent for the AI session when the category is the category for the AI session and bypassing the AI agent for other categories of the plurality of categories (step 56). The input contemplates any input mode, e.g., text, audio, gestures, etc. Also, the terms "class" and "category" are used here interchangeably to represent a label of the input.

A first objective of the process 50 is to classify any entry or ongoing entry into the entry box 12 (or search box 14 or equivalent) into a specific category or class of a predefined plurality of classes. In the process 50, one of the classes is an AI session which can be given a name such as a CHAT category. In an example embodiment, there can also be a URL category and a DATA category, i.e., the plurality of categories also includes a category for a Uniform Resource Locator (URL) for loading an associated address and a category for data for obtaining a resource from an external system. In an embodiment, there can be three classes, i.e., URL, DATA and CHAT. The URL category is for loading a literal web address which can be immediately preloaded by the browser based on a categorization in advance of receiving the whole entry and based on predicting the end URL. The DATA category is for a resource that must be loaded from an external system, such as the current weather, sports scores, a search query, etc. Finally, the CHAT category is for an AI session.

Those skilled in the art will appreciate in practice there are many more classes encompassing a variety of scenarios (shopping, history, calendaring, communications, etc.), but these three classes are presented for illustration purposes (and indeed, there are embodiments of the invention with just two classes). An aspect of the plurality of categories is that every input into the entry box 12 should be categorized into one of the plurality of categories. There can be a catch-all category such as for a search query, e.g., where the input appears random and is not classified into any other category.

The present disclosure contemplates various approaches to classification. The actual classification may be accomplished by non-AI approaches, by AI approaches, or a combination. For instance, the detection of URLs can be carried out primarily using regular expressions or other matches, which run in microseconds on modern hardware. Regular expressions (regex) are patterns used to match specific sequences of characters within text, commonly used for searching, validating, or manipulating strings. They provide a powerful tool for defining search patterns with special characters and symbols, enabling flexible and efficient text processing in programming and data analysis. Regular expressions can detect a URL by matching its typical structure, including protocols like http or https, followed by domain names and optional paths or parameters. A basic pattern, such as https?:W[^\s/$.? #].[^\s]*, captures URLs by identifying key components like the protocol, valid domain characters, and additional segments. Similarly, weather may often times be detected by a simple examination of strings such as "<NAME> weather" or "weather in <NAME>." Other common topics can be predefined for detection using this approach, e.g., sports, shopping, etc.

The AI agent may also be used to do this classification, by using an AI agent to classify the input. Even in the case where the AI agent is used, it represents a significant savings over passing the input to a complete AI chat session, as AI classifiers are much smaller and more portable than fully generic AI models, thus allowing them to be locally and quickly executed on most hardware. In another embodiment, the classifying is performed by an AI model associated with the AI agent, the AI model being a general-purpose AI model configured to perform the AI session as well as to provide the classifying. This approach is described in further detail herein and advantageously allows the user device to use the AI agent for both classification and for the AI session.

In the hybrid case, non-AI approach may be used to determine a particular class only if the confidence is very high by the non-AI approach, and then falling back to the AI classifier only in ambiguous cases. For example, if a user types a URL, but misspells "HTTP" as "HTP," a regular expression-based approach would be unlikely to catch this scenario, while an AI method would identify the URL. Even when each step in such a hybrid methods is not 100% effective, it still saves significant user time for each case it can successfully predict. Here, the classifying is performed first using matching via regular expressions as the input is being received until a confidence level is reached, and second via an AI model associated with the AI agent where the confidence level is not reached or where there is no improvement in the confidence level as further input is received.

In an embodiment, the classifying is performed as the input is being received until a confidence level is reached, without having a full input from the user. In addition to the base case where the classification is performed once at the end of the user input, the classification can also be run serially after each character or group of characters are entered. By repeatedly running the classification, a confidence score for the likely outcome can be prepared. Based on this confidence score, relevant resource may be pre-allocated or accessed so that when the final user input is known the most likely scenario is already prepared and can be provided nearly instantly. For example, if it's highly likely that the user is entering a URL, the most likely page may be preloaded. Furthermore, even in the case where the user actually does mean to access an AI-chat session, the connection to the AI agent (whether local or remote) may be prepared, the base prompts loaded and even some parts of the query pre-fed into the agent. As these steps often account for half or more of the total time to get an AI response, such pre-preparation saves significant time, while not wasting the resources that would be inherent in blindly starting an AI session for every entry. Here, the classifying includes: for each character of the input during the receiving, attempting to determine the category; determining a confidence score for each of the attempts; and determining the classified category based on a level of the confidence score.

Once the class is determined, the correct action is performed, either via an AI-model or via a direct access to the relevant resource, skipping the AI model where appropriate. In an embodiment, performing the action includes pre-loading a webpage if the category is a Uniform Resource Locator (URL). In another embodiment, the performing the action includes, if the category is the AI session, performing a connection to the AI agent; and loading base prompts and some parts of a query to the AI agent. Of course, there can be various other actions all with the objective of improving speed, user experience, etc.

Again, the process 50 enables the quick and precise classification of the user interaction automatically as the user types in the browser entry box (or alternatively, immediately upon hitting the "return" key, or action button). This process 50 allows the nearly instantaneous tagging of the user's intent. Since the intent can be quickly determined, the slow, expensive and non-deterministic may be entirely omitted in cases where it is not necessary, saving costs, but also significantly improving response speed and continuing to provide a partially available system in the case where the AI agent is unavailable (either due to a lack of connection to a hosted model or a lack of local hardware to execute the more advanced task on a local model). The combination of these features in a browser provides a uniquely fast and effective user experience.

History and Location

In various embodiments, the AI intent can use history, location, etc. to assist in determining the context, classification, etc. History includes a current history, e.g., in a current session, as well as longer term history, e.g., over the previous day, days, or weeks. Location also includes a current location as well as a location history. These can be used as inputs in the classification process to further assist in identifying intent. In an example, if an entry box 12 is over (overlay) one video over another video (imagine there are 10 videos on a page), we ask a question, "what's this video about", it will give us the video description of that video. If it is over the (e.g., college application), we give inputs in the entry box 12, it will be specific to that portion of the page. Further, the location and history can be used to make the AI intent user-specific.

Using General-Purpose AI Models as Special Purpose Classifiers

In a variety of scenarios, including with the process 50, it is necessary to classify some data, such as a user query, piece of text or other data, into one of several classes. As noted above, this can be done using classical approaches such as regular languages, grammars, etc., although these approaches are usually quite brittle and require significant ongoing work to maintain. It is also possible to train AI models which output one of the desired classes. While these AI approaches tend to be more flexible in terms of input format and adaptability, they require expensive, time-consuming training, and retraining if the classes (or even the expanse of the classes) are changed. Additionally, in the case of the process 50, this would require two different AI models on the user device.

With the recent advent of general-purpose AI models, such as Large Language Models (LLMs), it has become possible to ask a generic question of an AI model and have it provide a response. However, AI models can produce almost any output, and ensuring that a general-purpose model produces an answer from a deterministic set of classes remains an open problem. That is, the deterministic set of classes means the output is the exact string or value from an enumeration each time for a given class. A general-purpose AI model may vary its answer, e.g., asking to categorize an input between CHAT, URL, and DATA, the general-purpose AI model could give different answers for the same class, e.g., this is a chat session, or this is a request for an AI session, etc. The goal in classification is an exact class, e.g., CHAT, URL, and DATA.

In addition, mapping the model response to the classes may be difficult with precision. Finally, the cost, whether in cloud resources or local system requirements, to run a fully general-purpose model, coupled with the lengthy process of generating a complete response reduces the effectiveness of using a general-purpose model as a classifier.

Accordingly, the present disclosure includes an approach to adapt a general-purpose model to act as a classifier through a combination of prompting tricks and modification of the token probabilities inside the model. In addition, pre-prompting or a LoRA can further speed up this process. By carefully manipulating both the input and output token stream, the model can be guaranteed or virtually guaranteed to return one of a set of desired classes, e.g., URL, CHAT, or DATA, in the exact format required. This enables use of a single AI model for both classification and other purposes, e.g., classifying the categories in the process 50 and performing the AI sessions.

Of note, a classifier model is in many ways similar to a model that just produces a unique and identifiable output which is one of the classes. That is, while a classifier model may have an array of output neurons each of which represents one class, a general-purpose model may just as well output "CLASS", "CLASSB", etc. But it needs to do so quickly and with certainty, to which the inherent tokenization techniques of most models is not well suited.

Tokenization in a general-purpose AI model is the process of breaking down text into smaller units called tokens, which can be words, subwords, or characters. This step is essential for converting text into a numerical format that AI models can process. Tokenization helps handle unknown or rare words by splitting them into meaningful components and preserves the structure and sequence of text for context-aware understanding. Various methods, such as word-level, subword, and character-level tokenization, ensure that the model can efficiently interpret and generate language-based outputs.

In this description, we will define T<A> to mean "the token which is produced for the letter A", and T[foo] to mean "the token which is produced for the abstract concept foo" (such as stop characters and other special purpose tokens). When prompting a model, the input is typically fed into the model as a series of numbers, usually representing several input characters or entire words. For instance, the word URL might be represented as three tokens for T<U>, T<R> and T<L>, or more efficiently as T<URL> or even as T<URL> (with a trailing space as part of the token). During the tokenization phase of an AI model, the text is converted into tokens in a process which usually aims to produce the fewest number of tokens (so, for example the sentence "please determine if this input is a METRIC or IMPERIAL measurement", in a system for converting between units). The typical tokenization step might encode this as something like . . . T<is>, T<a>, T<METRIC>, T<or>, T<IMPERI>, T<AL>, T<measurement>. In any case, it will likely not encode two unique tokens for T<METRIC> and T<IMPERIAL>, but these are what we want in order to have a clear output from the classification.

To solve the problem of providing an answer from a deterministic set of classes, one can first feed the input prompt through the normal tokenization step, and then replace the relevant tokens around the classes to ensure that each desired class appears each time in the prompt as exactly one unique token. For example, if the token dictionary for a model does not contain a single specific token T<METRIC>, we might use T<metric> instead. While it would be possible to use an arbitrary specific token, it was observed that this technique works best when the tokens used are broadly related to the concepts of the classes, as the hyperparameters of the model tend to encode these concepts similarly. That is, the specific classes being sought for classification are explicitly included as tokens in any prompt to the general-purpose AI model.

As an example, assume one wishes to classify whether an input is metric or imperial units, namely the objective is to get an answer of "metric" or "imperial." Now, typically, the general-purpose AI model can provide varying outputs, e.g., "metric," "Metric," "the input is metric-based," etc. But the goal is to have an exact string each time. For example, we might encode the original prompt "please determine if this input is a METRIC or IMPERIAL measurement" as something like T<is>, T<a>, T<metric>, T< >, T< or >, T<imperial>, T< >, T<measurement>. By performing this transformation, we have ensured that each of the classes appears in our prompt as a unique token. We could certainly retrain the model to have additional tokens such as T[metric units] or T[us customary units], but doing so would require retraining and cause the model to lose generality, completely obviating our purpose which is to leave the underlying model untouched.

Even with this encoding, we have not ensured that the model will directly produce a unique class. Although this prompting method helps, the model may still end up producing a more sentence like output such as "the units are metric". As a result, we would still need to process the output and might not be able to definitively determine the correct class, as the model can produce nearly any conceivable output. In order to solve this problem, we can reweight the token probabilities of the specific tokens which we make up our classes. The exact values for this depend on the specific model, but in our testing multiplying the probabilities of the specific tokens we used as the classes by 1000× resulted in always returning one of those classes. In this example, the token weights can be

| Token | Weight |
|---|---|
| T<is > | 1 |
| T<a > | 1 |
| T<metric> | 1000 |
| T< > | 1 |
| T<or > | 1 |
| T<imperial> | 1000 |
| T< > | 1 |
| T<measurement> | 1 |

Of course, other values are possible in practice. The key here is that the significant overweighting of the T<metric> and the T<imperial> tokens results in one of these being the output.

This is an approach of prompt engineering to instruct the general-purpose AI model to product a single class output and reweighting the tokens to guarantee the same exact output string for each class each time. Prompt engineering involves crafting the input in such a way that a general-purpose AI model understands the task and provides accurate results. If you want the model to classify a query into one of three categories-let's say "Product Inquiry," "Technical Support," or "General Information"-you can structure an example prompt like this:

"Classify the following query into one of these categories: Product Inquiry, Technical Support, or General Information. Here is the query: 'I need help understanding how to reset my device.'"

In addition to this prompt, the tokens will overweight the tokens for the three categories, T<Product Inquiry>, T<Technical Support>, and T<General Information>. The model will analyze the query and classify it into one of the provided categories.

In the example above for classifying user intent based on the user interaction with the entry box, using URL, CHAT, and DATA as an example, the AI agent with the general-purpose AI model on the user device can be fed an example prompt like this: "Classify the following query into one of these categories: URL, CHAT, or DATA. Here is the query: 'What is the weather today.'"

Also, the tokens will overweight the tokens for the three categories, T<URL>, T<CHAT>, and T<DATA>. In this example query, the result is DATA, e.g., query the local weather from an external system. This prompt can be fed in as the user types. For example, the query can be in various stages of completion and the AI agent will likely find a confident class of DATA and specifically the weather during typing of the word "weather."

With that reweighting (and limiting the model to predict just a single token of output), it is possible to use a general-purpose model as a special purpose classifier. One particular advantage of this approach is that it does not require shipping a separate model or even a LoRA for the model, both of which take up extra space and also require loading an additional model in memory, which is advantageous on user devices. Also, even if there is sufficient space to store multiple models in long term storage, changing models often requires completely unloading the previous model and loading a new one, a slow and costly process. By enabling the use of a general-purpose model for this specific task, it is possible to pre-load the model and use it both for classification and other tasks. In addition, by limiting the desired output classes to single tokens, it is not necessary to run the model for multiple tokens of output, hoping that the model correctly identifies a stopping point, but rather, the model may be confidently run for just a single token of output which can then be immediately mapped to one of the desired classes.

Note, the prompt to the AI model can include various aspects such as a task instruction, context, query data, and the desired output. The task instruction, context, and desired output can be combined here to include an instruction to ask for categorization of a query into one of a plurality of categories and an output being a single category. The query is the input that is being categorized, e.g., the input to the entry box 12, including a partial input.

Finally, if it is known that the next task a model will need to perform is a classification, it is possible to pre-feed all the elements of the prompt right up until the user input into the model and then "freeze" the model in this state (indeed this frozen model may even be written out to disk in this state, although we have not found it advantageous to do so yet, it might be useful in a case where disk was extremely expansive and memory was very limited). Once the model is "primed" in this way, it only requires a few tokens of input (the user's input) and a single token of output (the class-token) in order to produce the class, meaning that the vast majority of the processing time may be completed before the classification, bringing the performance of this method on par with a fully loaded special purpose model, while having none of the downsides of shipping, supporting and loading a special purpose model.

FIG. 3 illustrates a flowchart of a process 100 for using general-purpose AI models as special purpose classifiers. The process 100 contemplates implementation as a method having steps, via an apparatus with one or more processors configured to implement the steps, and as a non-transitory computer-readable medium storing instructions that, when executed, case one or more processors to execute the steps. The steps include utilizing a prompt for a general-purpose Artificial Intelligence (AI) model with the prompt including instructions to perform a classification of an input into one of a plurality of categories (step 102); tokenizing the prompt and the input into a plurality tokens including a unique token for each of the plurality of categories (step 104); biasing weights of the plurality of tokens such that the unique token for each of the plurality of categories have greater weights than other tokens of the plurality of tokens (step 106); and inputting the plurality of tokens with their corresponding weights into the AI model (step 108).

The steps can further include receiving an output from the AI model with the output being a category of the plurality of categories corresponding to the input. The steps can further include performing an action which is based on the category. The steps can further include utilizing the AI model for an AI session based on the category determining the input is requesting the AI session. The steps can further include feeding the plurality of token with their corresponding weights for the prompt to the AI model prior to receiving the input. The steps can further include receiving the input from a user and continually feeding tokens for a partial version of the input to the AI model with the plurality of token with their corresponding weights for the prompt already fed into the AI model. In an embodiment, the general-purpose AI model is executed on a user device for both the classification and for AI sessions.

AI Model Bundling and Splitting for widescale distribution

AI models are extremely useful, but running them can be a challenge. Even in the context of high-powered server systems, tuning and running models has already spawned an entirely new sub-specialty of ops in "MLOps." MLOps (Machine Learning Operations) is a set of practices that combines machine learning with DevOps principles to streamline the development, deployment, and management of machine learning models in production. It focuses on automating the entire ML lifecycle, including data preparation, model training, evaluation, deployment, monitoring, and continuous retraining. Key components of MLOps include collaboration between teams, versioning for reproducibility, CI/CD pipelines for automated model updates, and monitoring for performance and drift. By implementing MLOps, organizations can ensure that machine learning models are scalable, reliable, and efficiently managed in real-world applications.

This challenge is only magnified when applied to running models on end user devices, e.g., laptops, desktops, smartphones, tablets, etc. One approach is to only limit the models to the latest and most powerful hardware with built-in AI accelerators. While this approach significantly simplifies the problem, it also severely restricts the potential user base to only those with the latest devices. Another solution to this problem is to run the models directly on the device CPU or on a combination of the CPU and legacy GPUs. This works well, however it often requires the models to be quantized (to have the precision of each number lowered) in order to allow the model to fit into available memory (Random Access Memory (RAM) or Video RAM (VRAM)). In addition, due to differences in the hardware, some encodings which are highly efficient on CPUs do not work on certain GPU architectures and vice versa.

A conventional solution is to ship a model that is aggressively quantized to the minimum supported operation, which results in a sub-optimal model performance. In addition, when the model is split and partially run on the CPU and GPU, this results in a model which lacks out on the most efficient CPU encoding, since some layers need to run on the GPU To that end, the present disclosure describes three progressive solutions to the problem of widescale distribution of AI models, especially onto a diverse range of hardware. First, we define an optimal quantization of a model, which uses the most efficient quantization for each layer in the model, depending on its destination at runtime. Secondly, we define an "out of order" loading of the model, which allows us to use a non-linear quantization of the model, keeping the most "important" parts in higher fidelity, and also keeping them on the most relevant device. Finally, we define a "layer catalog" which allows for efficient distribution of models without having to create an exponential number of different specific encodings of the models.

Quantization is a model optimization technique that reduces the precision of a machine learning model's parameters from higher bit formats, like 32-bit floating-point, to lower ones, such as 8-bit integers, to improve efficiency. This reduces the model's size, speeds up inference, and decreases power consumption, particularly beneficial for deployment on resource-constrained devices like smartphones. There are different types, including post-training quantization and quantization-aware training, with the latter helping to maintain model accuracy. While quantization can lead to slight accuracy degradation, it is a widely used method to make machine learning models faster and more scalable.

That is, when distributing a model to run on end user devices, it is common to reduce the precision of the model weights. This quantization significantly reduces the storage space and memory required to run the model. In addition, it is common to load some layers of the model (typically the first layers) on the GPU while reserving others to the CPU, so as not to exhaust available GPU memory. Note, for illustrative purposes, the present disclosure utilizes GPU, but other types of processors are contemplated, e.g., Neural Processing Units (NPUs), Tensor Processing Units (TPUs), etc. Further, the general approach of having two target execution devices (e.g., CPU and one other) can be scaled to three or more.

Some of the encoding schemes for quantized models (such as the highly efficient ternary encoding scheme, and probably other schemes) are not practical on some GPUs. Therefore, when distributing a model, it either must be quantized in a GPU compatible format if some layers are loaded to the GPU, or it may be quantized in a GPU incompatible format, but then the GPU cannot be utilized at all. In all of the following discussion the split-quantization is discussed as a per layer operation for simplicity, but each method below can be just as well applied on a per row or column basis, as required for optimal packing or model performance.

We define a multi-quantized model. In such a model, we store a small auxiliary data structure which includes information about the quantization of each set of parameters, and then quantize each individual layer, or even each individual set of parameters to a different quantization layer. For instance, if we know that the available GPU VRAM is N and the available CPU RAM is M, then we can pick a set of X layers which are encoded in a GPU compatible format that just fits inside N and another set of Y CPU compatible layers that just fit in M. In this way, we can achieve the highest possible fidelity of the model in the available RAM. Alternatively, we can pick a value of X which puts as many layers as possible in the N GPU VRAM and then use a more efficient CPU only coding for the remaining layers, thus achieving the minimum possible impact on CPU RAM and the highest possible usage of the GPU.

Naturally, when performing such a split quantization, the exact number of layers in each of the X and Y encodings is highly dependent on system resources. It is the case, however, that some of the layers are much more important for producing a desirable output from the model (for instance the first and last layer or few layers, or earlier columns in the attention section of attention-based models). In this case, it may be desirable to put as many of the middle layers as possible in the GPU (or indeed, the opposite, depending on the precision of the GPU). In that case, each layer may be computed to have a weight n when put in the GPU and m when put in the CPU as well as an importance factor i along with a performance factor Pc for the CPU and Pg for the GPU. Once these weights are calculated, it is a simple optimization problem to optimize the placement of each layer based on maximizing the overall sum of P x i while maintaining the invariant that the sum of n and m value must fit within N and M. Of course, for practical reasons layers should be grouped together (that is, they should not alternate between GPU and CPU arbitrarily, since this will introduce extra processing latency), but rather they should be laid out, for example as a block of CPU layers, followed by a block of GPU layers, finally followed by a block of CPU layers.

In a similar manner, when the desired outcome is maximum performance, then the n and m values may be computed based on throughput for each device instead of on memory usage, and then the layer optimization strategy performed in a similar manner, maximizing performance factors. Finally, a combination of memory and performance values may also be considered for a "fully optimal" packing (that is a n_memory and n_performance may be defined for each layer and in the same way for m values), although in many practical cases the most important factor is fitting in the minimal memory, therefore the memory-oriented optimization is the most useful at the current time.

It will be observed that for each different system with a unique CPU, GPU and set of RAM, a different packing will be desired. Once factoring in the fact that different devices may also have different physical layouts for the quantization, this results in a large, multi-dimensional matrix of possible packings. Given that a fully quantized and packed model may still be several gigabytes, this can result in the necessity to spend significant compute time quantizing, packing and storing hundreds or thousands of models, and also the associated loss in distribution efficiency (for instance, failing to hit Content Delivery Network (CDN) caches) by having each specific model file only accessed a handful of times. It also requires that the exact layouts are known in advance, which requires significant pre-planning and surveys of end user systems.

To solve this, we propose a model catalog. The model catalog acts as a slice-based system. Instead of having to produce the product of all the different variations, each of the valid variations for a particular layer (or slice, in the more general case of parameters) is produced, along with a small header and trailer defining which are the valid previous and next slice and types as well as the relevant optimization coefficients. For instance, on a model with 100 layers and 4 possible encodings for each layer, the slice based system would need to produce at most 400 slices (representing 4 complete copies of the model), whereas producing the complete set might require nearly 4 million output files, each the full size of the model (although many of these would never be used—but even with a heuristic for these unused formats, many hundreds or thousands of copies of the entire model might be required).

Therefore, the layout optimizer can quickly be run on each system, using the header and trailer data and optimization coefficients in order to determine the ideal set of slices for the system, and then download just the relevant slices for that particular system. In addition to the huge improvement in processing time to prepare the models and significant reduction in storage space, the fact that popular files are requested by more clients also means that distributions methods like a CDN will also have improved performance, all while allowing an optimal model layout for each device, and obviating the need to determine the exact model layouts in advance.

In an AI model, layers represent stages where input data is progressively transformed into more abstract representations, known as encodings. The input layer handles raw data, such as token embeddings, while intermediate layers (such as dense, convolutional, or recurrent layers) extract increasingly complex features through operations like weight transformations, convolutions, or attention mechanisms. Pooling layers reduce spatial dimensions, recurrent layers capture sequential patterns, and transformer layers analyze relationships between all inputs. The output layer produces the final prediction, with each encoding at different layers carrying task-relevant information, guiding the AI model toward accurate results.

The layers are the structural components that process data in stages: the input layer receives raw data, hidden layers extract features and patterns, and the output layer produces predictions. Quantization is a technique used to make these models more efficient by reducing the precision of numbers (like weights and activations), typically from 32-bit floating-point to lower precision formats like INT8 or FP16. This reduces memory usage, speeds up computations, and lowers power consumption, especially on edge devices. Quantization can be applied post-training or during training (quantization-aware training), with the latter allowing models to adapt better to precision loss. Although quantization boosts efficiency, it can slightly degrade model accuracy, requiring careful handling, especially in more sensitive layers.

FIG. 4 illustrates a flowchart of a process 200 for AI model bundling and splitting for widescale distribution. The process 200 contemplates implementation as a method having steps, via an apparatus with one or more processors configured to implement the steps, and as a non-transitory computer-readable medium storing instructions that, when executed, case one or more processors to execute the steps. The steps include obtaining an Artificial Intelligence (AI) model having a plurality of layers (step 202); producing a plurality of slices, each slice is a layer or an identifiable sequence of weights (step 204); determining a header and a trailer each defining a previous slice and a next slice, respectively, and optimization coefficients (step 206); and serving the plurality of slices and corresponding headers, trailers, and optimization coefficients (step 208).

The steps can further include, for a given processing device having a set of hardware, performing the serving to provide a set of slices of the plurality of slices to construct a version of the AI model for the given processing device. In an embodiment, the producing a slice of the plurality of slices includes quantizing an individual layer of the plurality of layers for given hardware. The given hardware is a type of processor and an amount of memory. The type of processor can be one of a Central Processing Unit (CPU), Tensor Processing Unit (TPU), Neural Processing Unit (NPU), and a Graphics Processing Unit (GPU), and the memory can be one of Random Access Memory (RAM) and Video RAM (VRAM). In another embodiment, the producing a slice of the plurality of slices includes quantizing a plurality of parameters associated with an individual layer of the plurality of layers for given hardware. The given hardware is a type of processor and an amount of memory. The type of processor can be one of a Central Processing Unit (CPU) and a Graphics Processing Unit (GPU), and the memory can be one of Random Access Memory (RAM) and Video RAM (VRAM).

Example Processing Device Architecture

FIG. 5 illustrates a block diagram of a processing device 300. The processing device 300 can be a digital device that, in terms of hardware architecture, generally includes one or more processors 302, I/O interfaces 304, a network interface 306, a data store 308, and memory 310. It should be appreciated by those of ordinary skill in the art that FIG. 5 depicts the processing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processors 302 are hardware devices for executing software instructions. The processor 302 can be any custom made or commercially available processor, a CPU, GPU, NPU, TPU, an auxiliary processor among several processors associated with the processing device 300, a semiconductor-based microprocessor (in the form of a microchip or chip-set), or generally any device for executing software instructions. When the processing device 300 is in operation, the processors 302 are configured to execute software stored within the memory 310, to communicate data to and from the memory 310, and to generally control operations of the processing device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processors 302. The software in memory 310 can include one or more software programs, each of which includes an ordered listing of executable instructions for implementing logical functions. In the example of FIG. 5, the software in the memory 310 includes a suitable operating system 314, programs 316, and an AI agent 318. The operating system 314 essentially controls the execution of other computer programs and provides scheduling, input-output control, file and data management, memory management, and communication control and related services. The programs 316 may include various applications, add-ons, etc. configured to provide end user functionality with the processing device 300. For example, example programs 316 may include a web browser.

The AI agent 318 can include an AI model which can be used for classifying user intent based on user interaction with the entry box, which is a general-purpose AI model used as special purpose classifiers, and which is created based on the process 200 for AI model bundling and splitting for widescale distribution. For example, the processing device 300 can be a user device, e.g., laptop, desktop, smartphone, tablet, etc.

Example Screenshots

Figure 6:
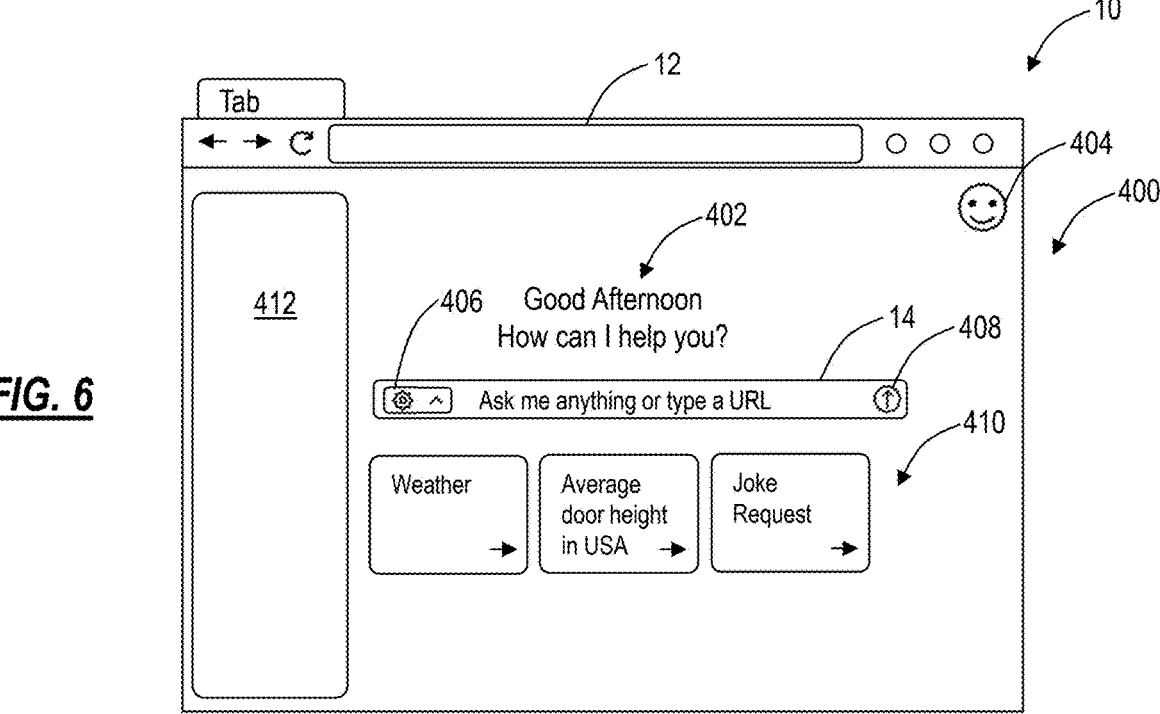

FIGS. 6 to 13 are screenshots illustrating example operations of the browser window and the various techniques described herein. FIG. 6 illustrates a screenshot of a landing page 400 in the browser window 10. Again, the browser window 10 includes the entry box 12 and the search box 14. In this embodiment, the AI user intent is in the search box 14. Of course, the AI user intent could be in the entry box 12, or both the search box 14 and the entry box 12. Again, the term entry box 12 can cover both the URL box and the search box 14. That is, the AI user intent can be in any box in the browser window 10 and the term entry box 12 is not meant to only mean the URL box.

Figure 7:
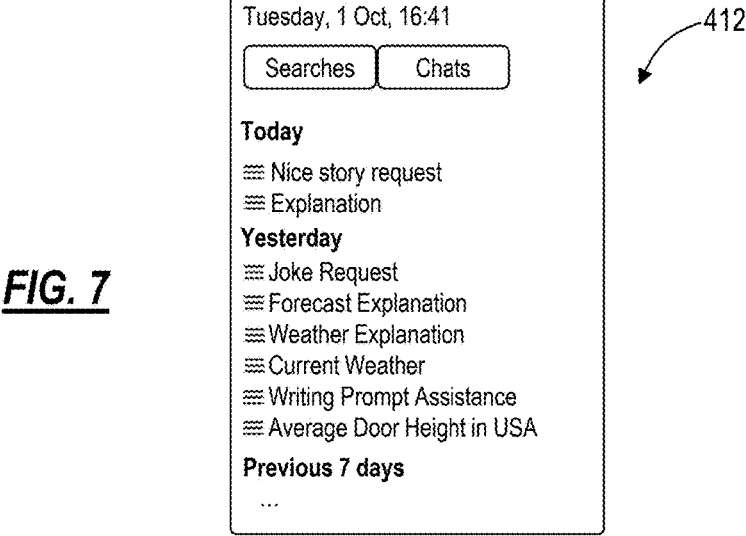

In this example, the landing page 400 includes the search box 14 with the AI user intent, a greeting 402, a user account icon 404, a session selection button 406, a refresh or reload icon 408, history tiles 410, and a sidebar 412. The greeting 402 can be personalized, based on the user account, in the user account icon 404, and provide instructions, notifications, etc. The user account icon 404 can be selected to view user account details, profile information, etc., as well as to show/hide the sidebar 412. An example of the sidebar 412 is shown in FIG. 7. This is often referred to as a "sidebar" or "activity log," depending on its function. If it shows a record of past actions or events, it can also be called a "history panel" or "history sidebar." This type of section is commonly used to display a list of previously visited pages, recent activities, or interactions.

The session selection button 406 can be selected to manually force a type of activity, e.g., CHAT, URL, or SEARCH. For example, FIG. 11 illustrates an example of the session selection button 406. Absent manual selection, the search box 14 can use the various techniques described herein to detect user intent. The refresh or reload icon 408 can be used to select input mode (e.g., audio, etc.), etc. The history tiles 410 can provide quick access to reload previous sessions, etc.

Figures 8, 9:
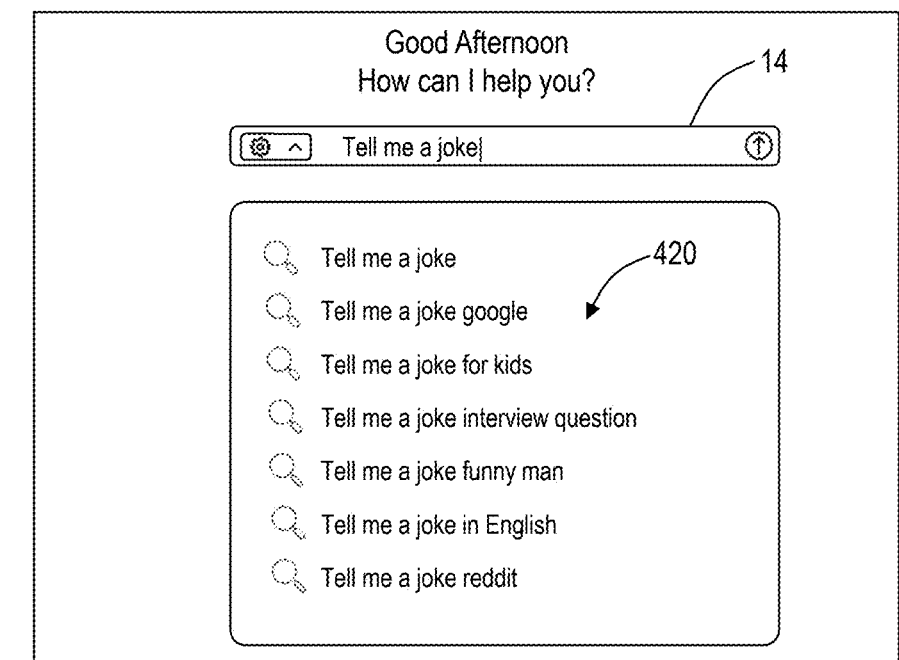

FIG. 8 illustrates an example operation where a user enters "tell me a joke" in the search box 14. As the input is entered, some guesses 420 are provided for the user to select instead of fully typing the entire query. Again, the AI user intent can detect early this is an AI chat session and preload prompts and other information, so that the joke can be immediate presented in a chat session 450 illustrated in FIG. 9. FIG. 10 illustrates another example operation where a user enters "what would be the weather to" and guesses 462 are presented.

Figure 12:
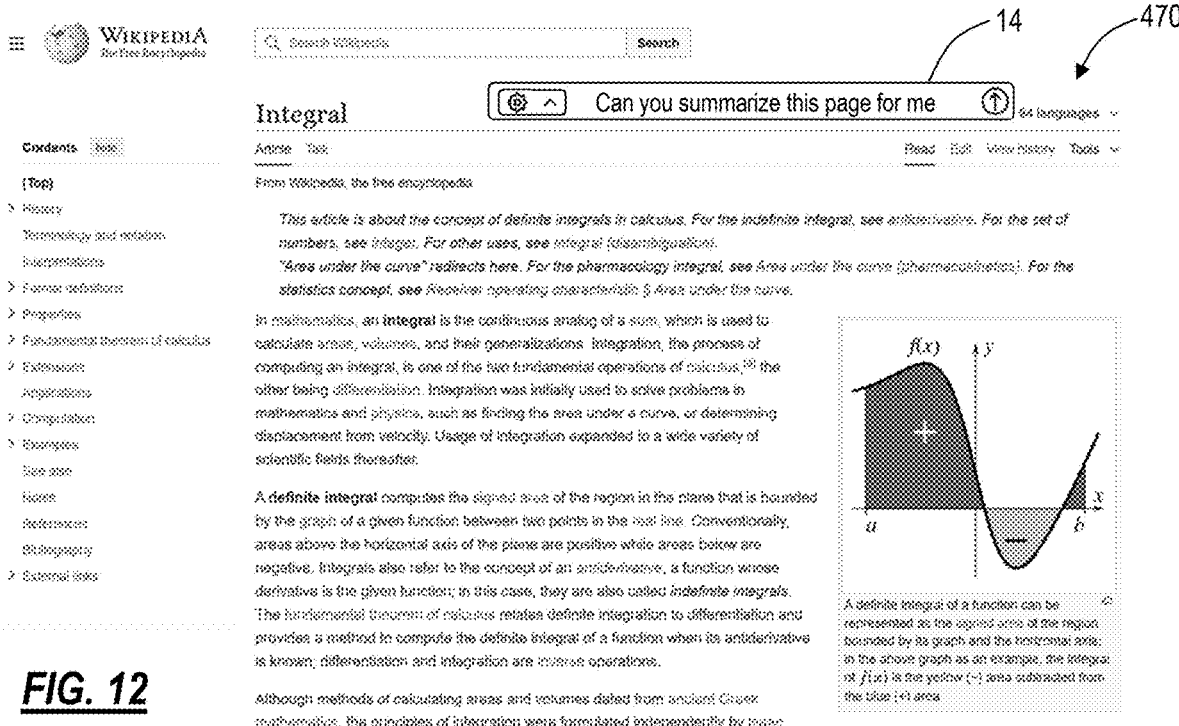
Figure 13:
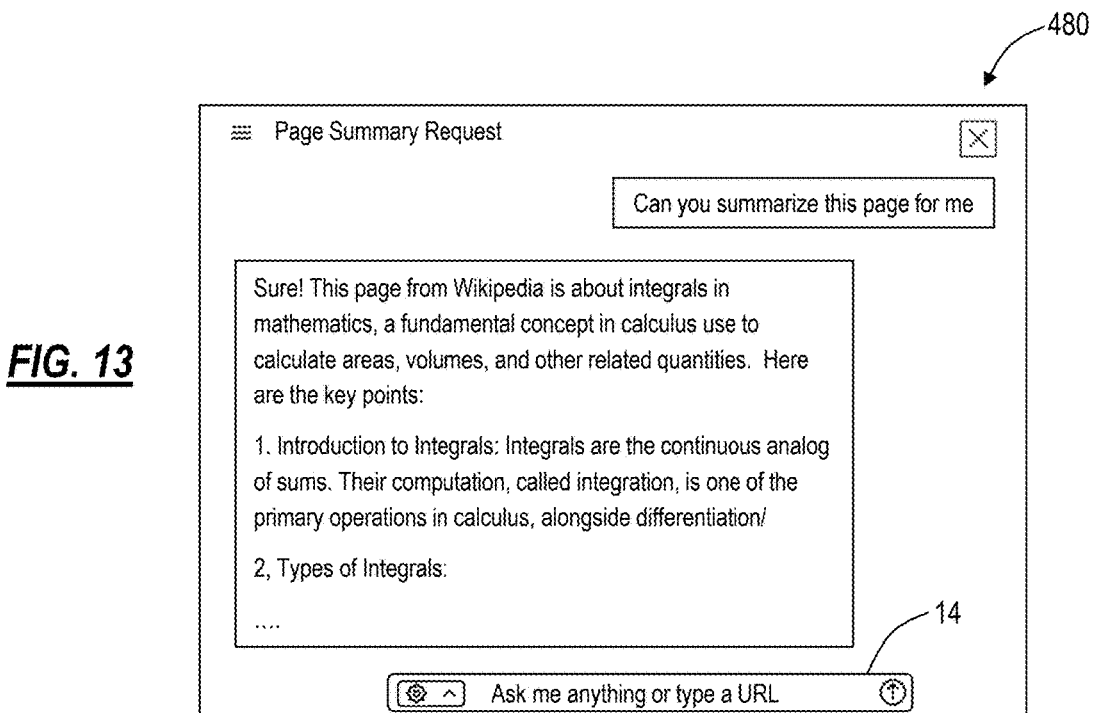

FIG. 12 illustrates a webpage 470, e.g., Wikipedia and the associated entry on integral. Here, the search box 14 can be called up over the webpage 470, e.g., via a hot key, selection, etc. The search box 14 can be used to interact with the webpage 470, e.g., tell me details about the webpage 470, its metadata, etc. Also, the search box 14 can be used to ask questions about the webpage 470, e.g., "can you summarize this page for me?" and a chat session 480 can be presented, as in FIG. 13. Of course, the interaction can take various forms in various AI chat sessions.

Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Neural Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

CONCLUSION

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable manner-whether collectively, in subsets, or individually-thereby broadening the range of potential embodiments.

What is claimed is:

1. A method implemented through a user device, the method comprising steps of:

receiving an input from a user in an entry box of a web browser on the user device;

classifying the input into a category of a plurality of categories including a Uniform Resource Locator (URL) category, a data/resource category and a category for an Artificial Intelligence (AI) session for an AI agent, the classifying being performed locally on the user device, as the input is being received and prior to completion of the input, and prior to initiating any remote AI-session or data-service request for the input, by first applying pattern matching using regular expressions until a confidence threshold is met and, if not met, invoking a general-purpose AI model associated with the AI agent that is configured via token reweighting to deterministically output a single-token class label; and performing an action responsive to the classified category, including preloading a webpage when the category is the URL category, establishing and priming an AI session when the category is the category for the AI session, and bypassing the AI agent for other categories of the plurality of categories.

2. The method of claim 1, wherein the classifying is performed by an AI model associated with the AI agent, the AI model being a general-purpose AI model configured to perform the AI session as well as to provide the classifying.

3. The method of claim 1, wherein the classifying is performed using matching via regular expressions, the regular expressions comprising predefined URL patterns and keyword templates that are executed entirely locally on the user device to filter likely categories before invoking any AI model.

4. The method of claim 1, wherein the classifying is performed first using matching via regular expressions as the input is being received until a confidence level is reached, and second via an AI model associated with the AI agent where the confidence level is not reached.

5. The method of claim 1, wherein the plurality of categories also includes a category for a Uniform Resource Locator (URL) for loading an associated address and a category for data for obtaining a resource from an external system.

6. The method of claim 1, wherein the classifying is performed as the input is being received until a confidence level is reached, without having a full input from the user.

7. The method of claim 1, wherein the classifying includes:

for each character of the input during the receiving, attempting to determine the category;

determining a confidence score for each of the attempting; and determining the classified category based on a level of the confidence score, wherein the confidence score is dynamically updated as each character is entered and used to trigger anticipatory preactions including connection setup of resource allocation.

8. The method of claim 1, wherein the performing the action includes pre-loading a webpage when the category is the Uniform Resource Locator (URL), the pre-loading beginning before the user completes the full URL input based on a predicted completion and continuing in parallel with the ongoing classification.

9. The method of claim 1, wherein the performing the action includes, when the category is the AI session:

performing a connection to the AI agent; and loading base prompts and some parts of a query to the AI agent.

10. A non-transitory computer-readable medium storing instructions that, when executed, cause one or more processors on a user device to perform steps of:

receiving an input from a user in an entry box of a web browser on the user device;

classifying the input into a category of a plurality of categories including a Uniform Resource Locator (URL) category, a data/resource category, and a category for an Artificial Intelligence (AI) session for an AI agent, the classifying being performed locally on the user device, as the input is being received and prior to completion of the input, and prior to initiating any remote AI-session or data-service request for the input, by first applying pattern matching using regular expressions until a confidence threshold is met and, if not met, invoking a general-purpose AI model associated with the AI agent that is configured via token reweighting to deterministically output a single-token class label; and performing an action responsive to the classified category, including preloading a webpage when the category is the URL category establishing and priming an AI session when the category is the category for the AI session and, bypassing the AI agent for other categories of the plurality of categories.

11. The non-transitory computer-readable medium of claim 10, wherein the classifying is performed by an AI model associated with the AI agent, the AI model being a general-purpose AI model configured to perform the AI session as well as to provide the classifying.

12. The non-transitory computer-readable medium of claim 10, wherein the classifying is performed using matching via regular expressions, the regular expressions comprising predefined URL patterns and keyword templates that are executed entirely locally on the user device to filter likely categories before invoking any AI model.

13. The non-transitory computer-readable medium of claim 10, wherein the classifying is performed first using matching via regular expressions as the input is being received until a confidence level is reached, and second via an AI model associated with the AI agent where the confidence level is not reached.

14. The non-transitory computer-readable medium of claim 10, wherein the plurality of categories also includes a category for a Uniform Resource Locator (URL) for loading an associated address and a category for data for obtaining a resource from an external system.

15. The non-transitory computer-readable medium of claim 10, wherein the classifying is performed as the input is being received until a confidence level is reached, without having a full input from the user.

16. The non-transitory computer-readable medium of claim 10, wherein the classifying includes:

for each character of the input during the receiving, attempting to determine the category;

determining a confidence score for each of the attempting; and determining the classified category based on a level of the confidence score, wherein the confidence score is dynamically updated as each character is entered and used to trigger anticipatory preactions including connection or resource allocation.

17. The non-transitory computer-readable medium of claim 10, wherein the performing the action includes preloading a webpage when the category is Uniform Resource Locator (URL), the pre-loading beginning before the user complete s the full URL input based on a predicted completion and continuing in parallel with the ongoing classification.

18. The non-transitory computer-readable medium of claim 10, wherein the performing the action includes, when the category is the AI session:

performing a connection to the AI agent; and loading base prompts and some parts of a query to the AI agent.

19. A user device comprising:

one or more processors; and memory storing instructions that, when executed, cause the one or more processors to:

receive an input from a user in an entry box of a web browser on the user device;

classify the input into a category of a plurality of categories including a Uniform Resource Locator (URL) category, a data/resource category, and a category for an Artificial Intelligence (AI) session for an AI agent, the classifying being performed locally on the user device, as the input is being received and prior to completion of the input, and prior to initiating any remote AI-session of data-service request for the input, by first applying pattern matching using regular expressions until a confidence threshold is met and, if not met, invoking a general-purpose AI model associated with the AI agent that is configured via token reweighting to deterministically output a single-token class label; and perform an action responsive to the classified category, including preloading a webpage when the category is the URL category, establishing and priming an AI session when the category is the category for the AI session and bypassing the AI agent for other categories of the plurality of categories.

20. The user device of claim 19, wherein the user device includes an AI model associated with the AI agent, the AI model being a general-purpose AI model configured to perform the AI session as well as to classify the input.

* * * * *